June 21, 1955
F. W. HENNING
2,711,070
GAS TURBINE APPARATUS
Filed July 31, 1952
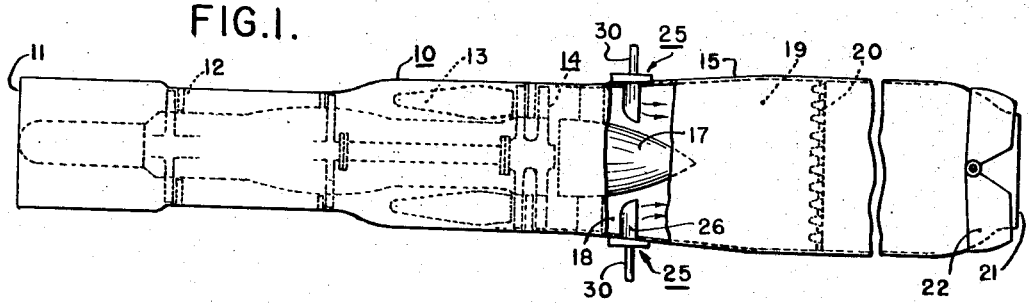
FIG. 1.
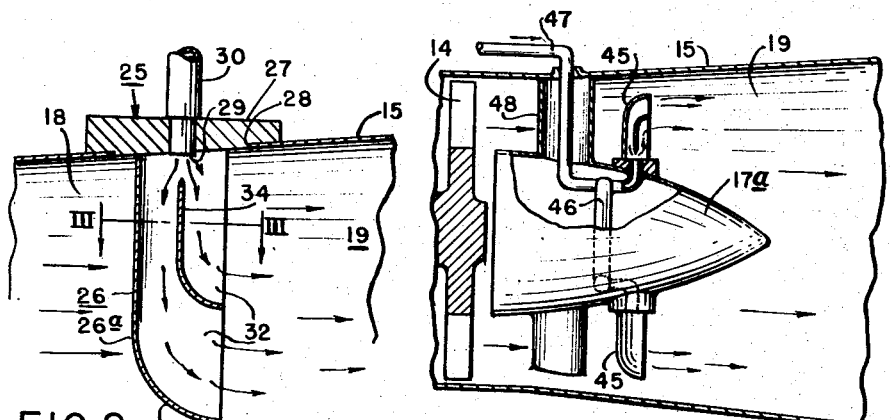
FIG. 2.
FIG. 6.
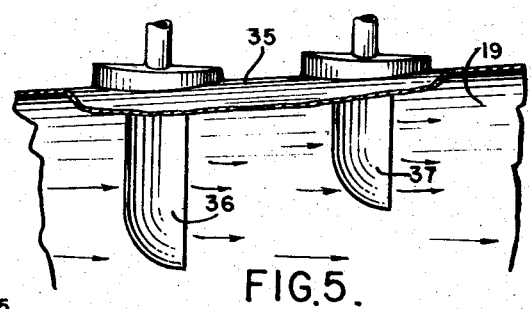
FIG. 5.
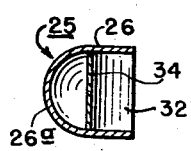
FIG. 3.
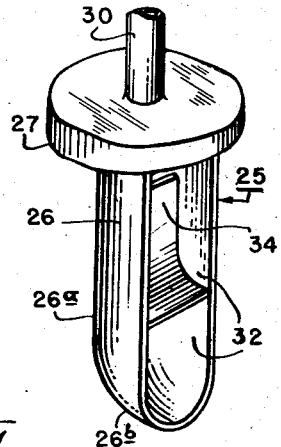
FIG. 4.
WITNESSES:
INVENTOR
FREDERICK W. HENNING
BY
ATTORNEY

United States Patent Office 2,711,070
Patented June 21, 1955

2,711,070

GAS TURBINE APPARATUS

Frederick W. Henning, Springfield, Pa., assignor to Westinghouse Electric Corporation, East Pittsburgh, Pa., a corporation of Pennsylvania Application July 31, 1952, Serial No. 301,920

4 Claims. (Cl. 60—35.6)

This invention relates to combustion apparatus and more particularly to fuel supply apparatus for high velocity combustion apparatus such as the afterburner of an aviation jet power plant.

In order to effect efficient supply of fuel to an afterburner, it has been proposed to provide fuel nozzles spaced within the afterburner casing and adapted to spray fuel into the combustion zone. The orifices of such interiorly disposed nozzles tend to become clogged with coke or fuel residues, owing to overheating of fuel as it flows through the nozzles and is discharged into the afterburner. To obviate this difficulty, it is proposed to provide means for effectively spraying fuel from an orifice or orifices located at suitable points on the afterburner casing, or inner wall structure, where relatively little heat will be picked up by the fuel prior to flow through the orifices.

It is, therefore, an object of the invention to provide improved fuel injector apparatus embodying fuel supply orifice means disposed on the wall of the combustion chamber at a point relatively remote from the combustion zone, and means for effecting adequate penetration and radial distribution of the fuel into the combustion zone, thus minimizing any tendency of the orifice to become clogged.

Another object of the invention is the provision, in afterburner apparatus having a diffuser passage and a combustion chamber communicating therewith, of an improved non-clogging fuel injector device disposed in the high velocity end of the diffuser passage and adapted to afford a mixing flow path of adequate extent as well as to prevent any tendency of the device to act as a local flame holder.

A further object is to provide an improved fuel injector device for association with a fuel supply orifice located in the wall of the combustion chamber of an afterburner or the like, in which an elongated shield having a downstream opening is mounted radially in the combustion chamber for turning the flow of fuel issuing laterally from the nozzle into flow in a downstream direction and then introducing such fuel uniformly into the combustion zone of the afterburner.

These and other objects are effected by the invention as will be apparent from the following description taken in connection with the accompanying drawing, forming a part of this application, in which:

Fig. 1 is a schematic view, partly in section, of an aviation gas turbine power plant embodying the invention;

Fig. 2 is a fragmentary, sectional view, enlarged in detail, of a fuel injector apparatus forming part of the power plant shown in Fig. 1;

Fig. 3 is a sectional view taken along the line III—III of Fig. 2;

Fig. 4 is a perspective view of the fuel injector device constructed in accordance with the invention as shown in Fig. 2;

Fig. 5 is a fragmentary sectional view of a portion of a power plant equipped with fuel injector devices arranged according to a modified form of the invention; and Fig. 6 is a fragmentary, sectional view of fuel injector apparatus embodying the invention in another form.

As shown in Fig. 1, a typical aviation gas turbine power plant for which the invention has been devised may comprise a tubular engine casing structure 10 having an air inlet 11 and housing components including an axial-flow compressor 12, combustion apparatus 13 and a turbine 14 operatively connected to the compressor, together with a cylindrical afterburner casing structure 15 which is secured to the engine casing structure at the exhaust side of the turbine. The afterburner casing structure 15 has mounted therein a strut-supported core or fairing cone 17 which together with the upstream end of the casing structure forms an annular diffuser passage 18. A combustion chamber 19 is formed in the afterburner casing structure downstream of and communicating with the diffuser passage 18. A suitable flame holder 20 may be mounted in the combustion zone of the combustion chamber. The afterburner casing structure 15 terminates in a nozzle 21, the flow area of which is determined by suitable variable area apparatus 22. In operation, air entering the inlet 11 is compressed by the compressor and delivered to the combustion apparatus 13, where fuel supplied by way of conventional fuel control apparatus (not shown) is burned to provide motive gases for expansion through the compressor-driving turbine 14. Gases and residual air exhausted from the turbine flow through the diffuser passage 18 to the afterburner combustion chamber and thence through the nozzle 21 for establishing the desired propulsive thrust. Additional thrust may be created when desired by combustion of fuel that is supplied to the afterburner apparatus in the manner hereinafter explained.

According to the invention, a plurality of fuel injector devices 25 are provided for supplying fuel to the afterburner combustion chamber 19, such devices being supported from the afterburner casing structure 15 at circumferentially spaced points near the upstream or high velocity end of the diffuser passage 18. As best shown in Fig. 2 of the drawing, each fuel injector device 25 comprises an elongated radially extending shield element 26 carried by a plate or base member 27, which is welded or otherwise suitably secured to the casing structure in covering relation with an opening 28 therein, and which has formed therein a fuel supply orifice 29 that is connected through a conduit 30 with a suitable source of fuel (not shown). The shield element 26 is arcuate or substantially U-shaped in cross section (see Fig. 3), and has an outlet or opening 32 which faces in a downstream direction relative to the flow of gases and air in the passage 18. The closed upstream wall portion 26a of the shield element terminates in a curved portion 26b at the end remote from the fuel orifice 29, so that the path of fuel initially flowing radially into the shield from the orifice is turned into an axial-flow direction parallel to the path of gases in the passage 18, as the fuel is discharged through the downstream opening 32. For facilitating uniform distribution of the flow of fuel through the shield 26, a deflector baffle 34 is interposed between the upstream wall portion 26a and the downstream opening 32. The outer end of the deflector baffle 34 is aligned with the orifice 29 and spaced radially inward thereof, with respect to the annular passage 18. The opposite end of the deflector baffle 32 is curved and terminates intermediate the outer and inner ends of the downstream opening 32 of the shield element. More than one such deflector baffle may be employed, if desired.

It will thus be seen that with the fuel orifice 29 located in the casing structure and protected by the fuel injector device 25 which is disposed radially in the high velocity and of the annular diffuser passage 18, a fuel jet issuing from the orifice is permitted to penetrate the high-velocity, axial-flowing gas stream to the desired extent. Fuel introduced through the orifice 29 in a radial direction is deflected and uniformly discharged in an axially flowing direction by way of the downstream opening 32. Axially directed fuel is thus effectively mixed with the high velocity gases in the diffuser passage and carried into the combustion chamber of the afterburner apparatus. Since the fuel orifice is located on the afterburner casing at a relatively cool point remote from the combustion zone, clogging is minimized, as little heat can be picked up by fuel before it is discharged from the orifice. In addition, the shield element is prevented from acting as a flame holder owing to its location in the high velocity end of the diffuser passage.

As shown in Fig. 5 of the drawing, a power plant similar to that shown in Fig. 1 and including an afterburner casing structure 35 may be equipped with long and short fuel injector devices 36 and 37, if it is desired to provide for step injection of fuel, that is, injection of fuel to various radial distances so that burning will occur only on one flame holder ring as a means facilitating modulation of afterburning thrust in steps. The injector devices 36 and 37 differ in length, but otherwise may be substantially similar to the injector device 25 already described, and may be disposed in alignment longitudinally of the afterburner casing structure 35.

If preferred, fuel injector devices 45, similar to the injector device 25, may be mounted on a fairing cone 17a, for distributing fuel to the afterburner combustion chamber 19 from a manifold 46 that is carried and shielded within the fairing cone. The manifold 46 may be connected to the usual afterburner fuel source by way of a conduit 47 leading through a radially disposed hollow strut 48.

While the invention has been shown in several forms, it will be obvious to those skilled in the art that it is not so limited, but is susceptible of various other changes and modifications without departing from the spirit thereof.

What is claimed is:

1. In a gas motivated power plant, wall structure forming an axial-flow combustion chamber adapted to receive a high velocity stream of air under pressure, a fuel injection device comprising means providing a laterally directed fuel supply inlet in a wall of said chamber adapted to introduce fuel thereto in a direction substantially normal to the high velocity stream of air therein, an elongated shield secured to said wall structure immediately upstream of said fuel supply inlet and projecting radially into said chamber, said shield being of U-shaped cross section and having an opening directed downstream with respect to the flow of the stream of air in said combustion chamber, said shield having an arcuate end remote from said fuel supply end for facilitating the turning of fuel impinging thereon into the direction of the air stream, an arcuate deflector baffle mounted within the U-shaped shield, said deflector baffle having its main portion disposed in a plane spaced inwardly of and parallel to the downstream opening of the shield, one end of said deflector baffle being aligned with and spaced from the fuel inlet and the opposite end being curved and terminating at said downstream opening of the shield intermediate the ends thereof, whereby fuel supplied by way of said fuel inlet is diverted and turned in the direction of the air stream in the combustion chamber.

2. In a gas motivated power plant, wall structure forming an axial-flow combustion chamber adapted to receive a high velocity stream of air under pressure, a fuel injection device comprising means providing a laterally directed fuel supply inlet in a wall of said chamber adapted to introduce fuel thereto in a direction substantially normal to the high velocity stream of air therein, an elongated shield secured to said wall structure immediately upstream of said fuel supply inlet and projecting radially into said chamber, said shield being of U-shaped cross section and having an opening directed downstream with respect to the flow of the stream of air in said combustion chamber, said shield having an arcuate end remote from said fuel supply end for facilitating the turning of fuel impinging thereon into the direction of the air stream, and a second fuel injection device of similar construction mounted in the combustion chamber downstream of and in alignment with the first-named fuel injection device, said second fuel injection device being of different length and radial extent relative to the combustion chamber.

3. In a turbojet power plant including an afterburner, tubular wall structure forming a combustion chamber, means in the upstream portion of the afterburner forming an annular diffuser passage therein through which a high velocity stream of air is admitted to the combustion chamber, a fuel injection device mounted in the high velocity end of said diffuser passage, said device comprising an elongated shield of substantially U-shaped cross section extending radially and inwardly of said tubular wall structure, said shield having a closed upstream side and an opening facing in a downstream direction, a fuel orifice disposed in said wall in alignment with said shield for effecting distribution of fuel into the stream of air in the combstion chamber by way of said shield and the downstream opening therein, and at least one arcuate baffle deflector interposed in said shield between the closed upstream side and the downstream opening thereof, said baffle deflector having an arcuate end terminating at said downstream opening for dividing the flow of fuel to facilitate uniform discharge thereof into said combustion chamber throughout the radial extent of said opening in the shield.

4. In a turbojet power plant including an afterburner, an outer tubular wall enclosing a combustion chamber, an inner axially extending hollow fairing cone carried in spaced relation therein and forming an annular diffuser passage through which a high velocity stream of air is admitted to the combustion chamber, a fuel injection device mounted on said fairing cone in the high velocity end of said diffuser passage, said device comprising an elongated shield of substantially U-shaped cross section extending radially of said fairing cone, said shield having a closed upstream side and an opening facing in a downstream direction, a fuel orifice disposed in said fairing cone in alignment with said shield for spraying fuel into the combustion chamber by way of said downstream opening in the shield, and means for conducting fuel to said fuel orifice.

References Cited in the file of this patent

UNITED STATES PATENTS

| | | |
|---|---|---|
| 2,438,858 | Lindsey et al. | Mar. 30, 1948 |
| 2,592,748 | Sédille | Apr. 15, 1952 |
| 2,632,300 | Brzozowski | Mar. 24, 1953 |